US011599006B2

(12) United States Patent
Mittal et al.

(10) Patent No.: US 11,599,006 B2
(45) Date of Patent: Mar. 7, 2023

(54) GENERATION OF NESTED FREQUENCY COMBS IN A TOPOLOGICAL SOURCE

(71) Applicant: University of Maryland, College Park, College Park, MD (US)

(72) Inventors: Sunil Mittal, Rockville, MD (US); Mohammad Hafezi, Washington, DC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/515,757

(22) Filed: Nov. 1, 2021

(65) Prior Publication Data
US 2022/0137484 A1 May 5, 2022

Related U.S. Application Data

(60) Provisional application No. 63/107,784, filed on Oct. 30, 2020.

(51) Int. Cl.
*G02F 1/35* (2006.01)
*H04B 10/50* (2013.01)

(52) U.S. Cl.
CPC .......... *G02F 1/3513* (2013.01); *G02F 1/3536* (2013.01); *H04B 10/506* (2013.01); *G02F 2203/15* (2013.01); *G02F 2203/17* (2013.01); *G02F 2203/54* (2013.01); *G02F 2203/56* (2013.01)

(58) Field of Classification Search
None
See application file for complete search history.

(56) References Cited

U.S. PATENT DOCUMENTS

| 9,052,448 | B2 * | 6/2015 | Hafezi | G02B 6/29331 |
| 10,566,094 | B2 * | 2/2020 | Fork | G21B 1/19 |
| 10,725,131 | B2 * | 7/2020 | Clerk | H03F 3/20 |
| 11,340,514 | B2 * | 5/2022 | Mittal | G02F 1/365 |
| 2022/0137484 | A1 * | 5/2022 | Mittal | G02F 1/3536 |
| | | | | 359/326 |

OTHER PUBLICATIONS

S. Mittal, J. Fan, A. Migdall, J. M. Taylor, and M. Hafezi, "Topological Edge States in Silicon Photonics," in CLEO: 2014, OSA Technical Digest (online) (Optica Publishing Group, 2014), paper STu2M.2. (Year: 2014).*

(Continued)

*Primary Examiner* — Rhonda S Peace
(74) *Attorney, Agent, or Firm* — Quarles & Brady LLP; Yakov Sidorin

(57) ABSTRACT

Examples of the present disclosure include the use of a topological system including an array of coupled ring resonators that exhibits topological edge states to generate frequency combs and temporal dissipative Kerr solitons. The topological edge states constitute a travelling-wave super-ring resonator causing generation of at least coherent nested optical frequency combs, and self-formation of nested temporal solitons that are robust against defects in the array at a mode efficiency exceeding 50%.

20 Claims, 7 Drawing Sheets

(56) References Cited

OTHER PUBLICATIONS

H. Miyake, S. Barik, E. Waks, and M. Hafezi, "Design for Dielectric Slab Photonic Crystals to Realize Topological Edge States," in Conference on Lasers and Electro-Optics, OSA Technical Digest (online) (Optica Publishing Group, 2016), paper FF1D.4. (Year: 2016).*

S. Barik, H. Miyake, W. DeGottardi, E. Waks, and M. Hafezi, "Observation of Edge States at Telecom Wavelengths in a Nanoscale Topological Photonic Crystal," in 2017 European Conference on Lasers and Electro-Optics and European Quantum Electronics Conference, (Optica Publishing Group, 2017). (Year: 2017).*

Leykam, D. & Mittal, S. & Hafezi, Mohammad & Chong, Y.. (2018). Switchable Topological Edge States in Next-Nearest-Neighbour Coupled Resonator Lattices. Th4H.4. 10.1364/CLEOPR. 2018.Th4H.4. (Year: 2018).*

S. Mittal, G. Moille, K. Srinivasan, Y. K. Chembo and M. Hafezi, "Topological optical frequency combs and dissipative Kerr super-solitons," 2021 Conference on Lasers and Electro-Optics Europe & European Quantum Electronics Conference (CLEO/Europe-EQEC), 2021, pp. 1-1. (Year: 2021).*

M. Hafezi, "Towards non-classical topological physics in photonic structures," 2016 Progress in Electromagnetic Research Symposium (PIERS), 2016, pp. 802-802, doi: 10.1109/PIERS.2016.7734480. (Year: 2016).*

Bao et al., Laser Cavity-Soliton Micro-Combs, Nature Photonics, 2019, 13(6):384-389.

Chembo et al., Spatiotemporal Lugiato-Lefever Formalism for Kerr Comb Generation in Whispering Gallery Mode Resonators, Physical Review A, 2013, 87(5):053852, 5 pages.

Hafezi et al., Imaging Topological Edge States in Silicon Photonics, Nature Photonics, 2013, 7(12):1001-1005.

Kippenberg et al., Dissipative Kerr Solitons in Optical Microresonators, Science, 2018, 361(6402), 11 pages.

Mittal et al., Photonic Anomalous Quantum Hall Effect, Physical Review Letters, 2019, 123(4):043201, 6 pages.

Xue et al., Microresonator Kerr Frequency Combs with High Conversion Efficiency, Laser & Photonics Reviews, 2017, 11(1):1600276, 7 pages.

* cited by examiner

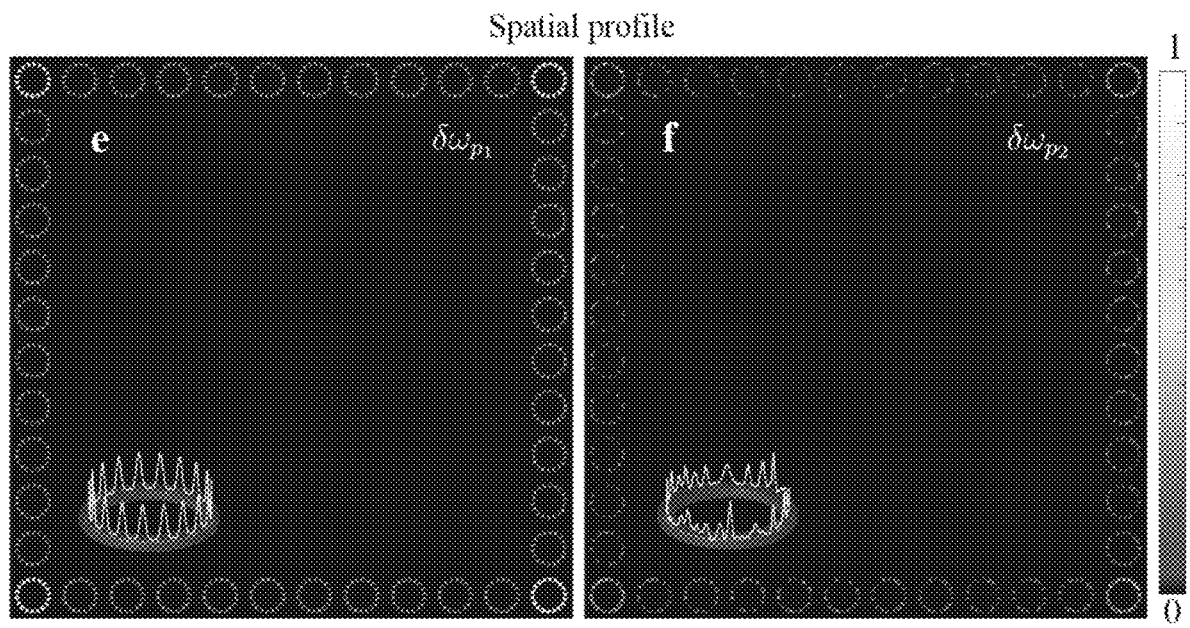
FIG. 2E　　FIG. 2F
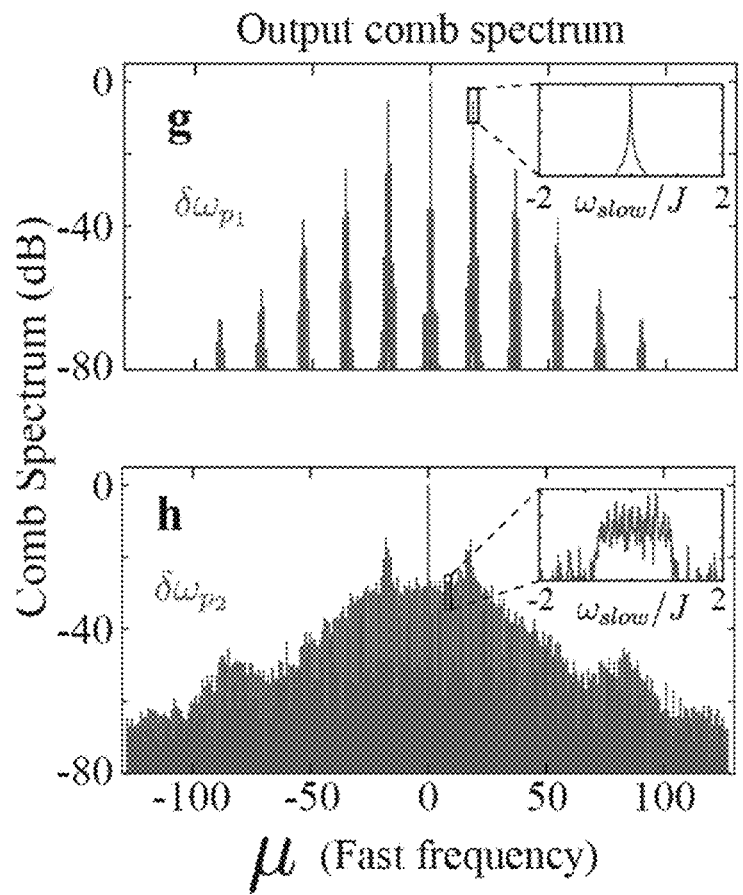
FIG. 2G
FIG. 2H

FIG. 2I FIG. 2J
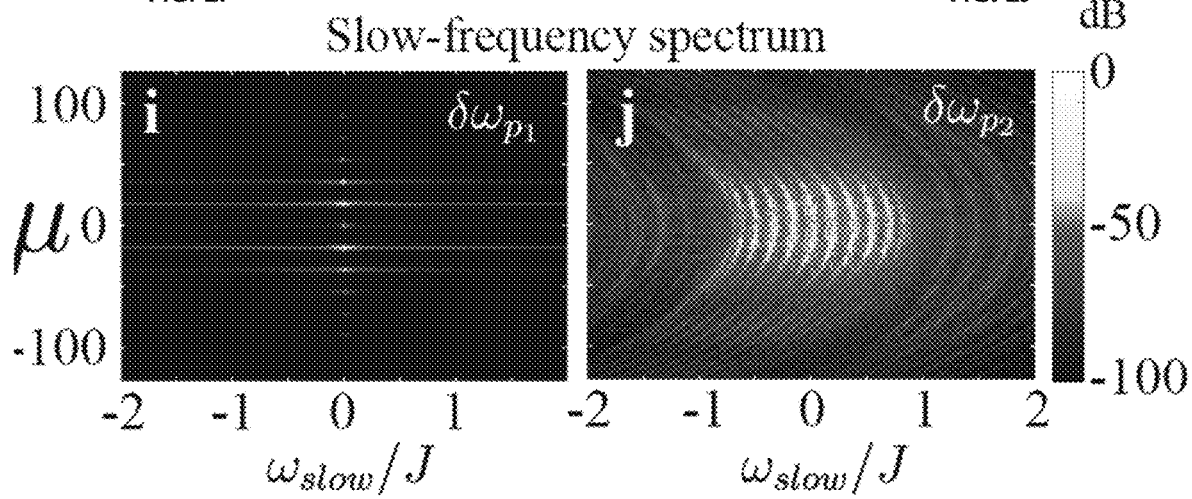
FIG. 2K FIG. 2L
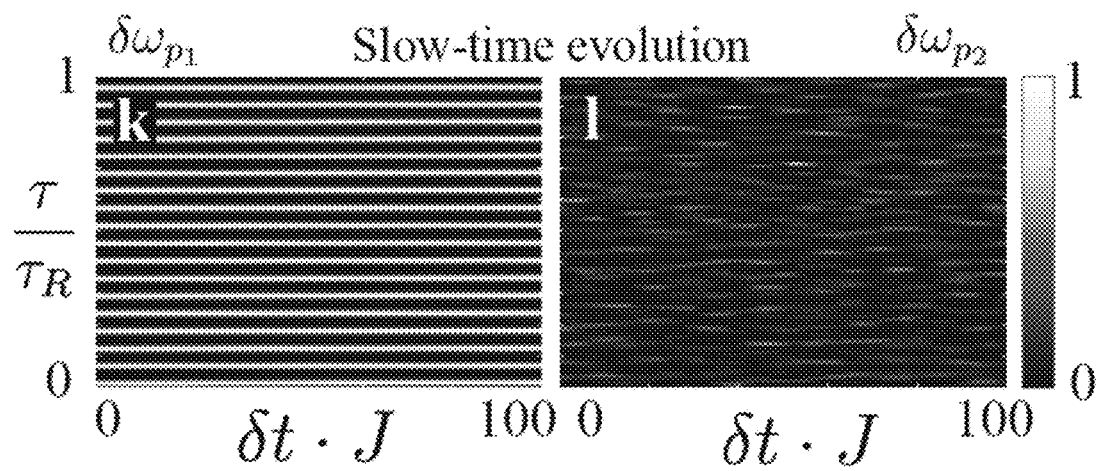

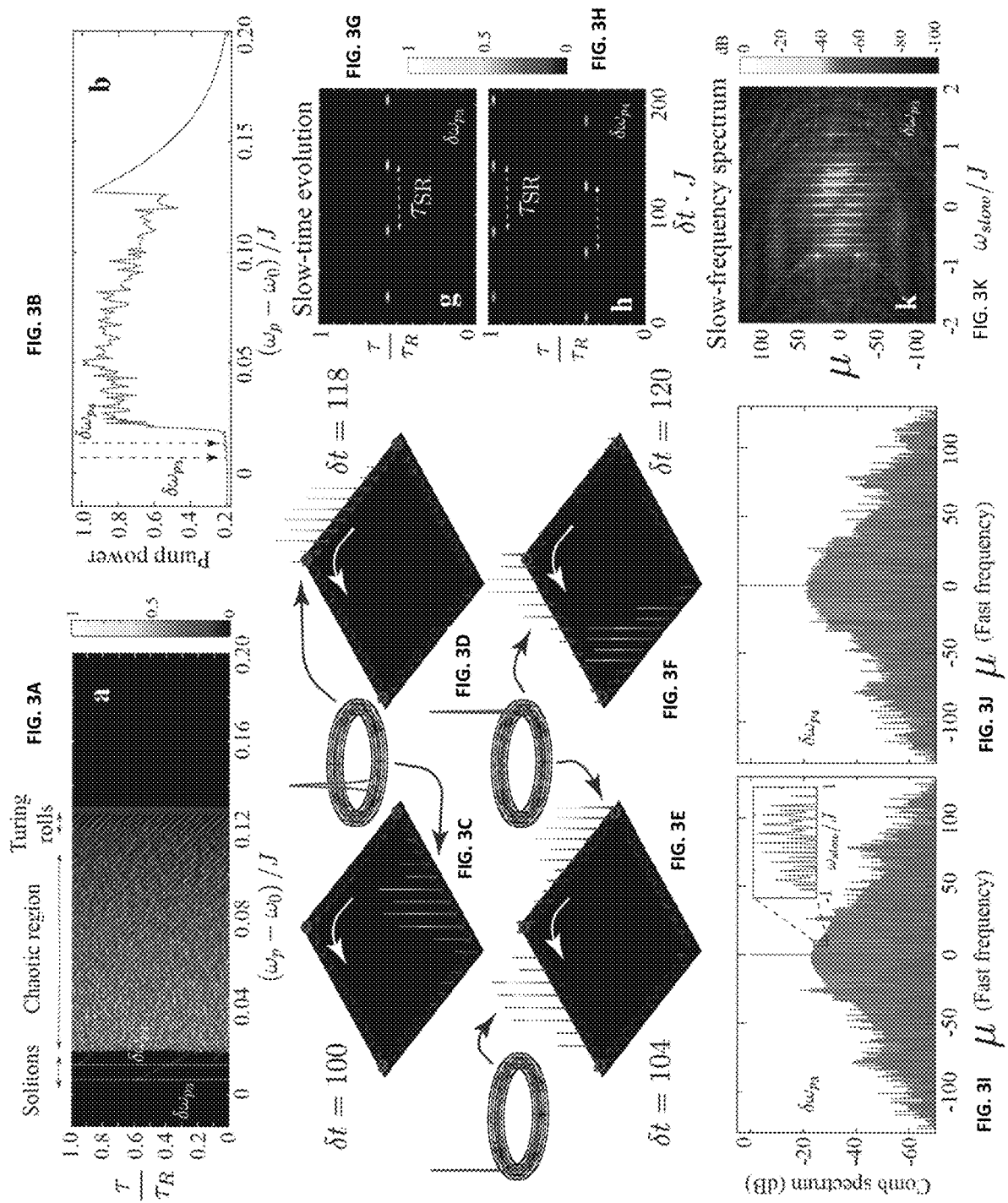

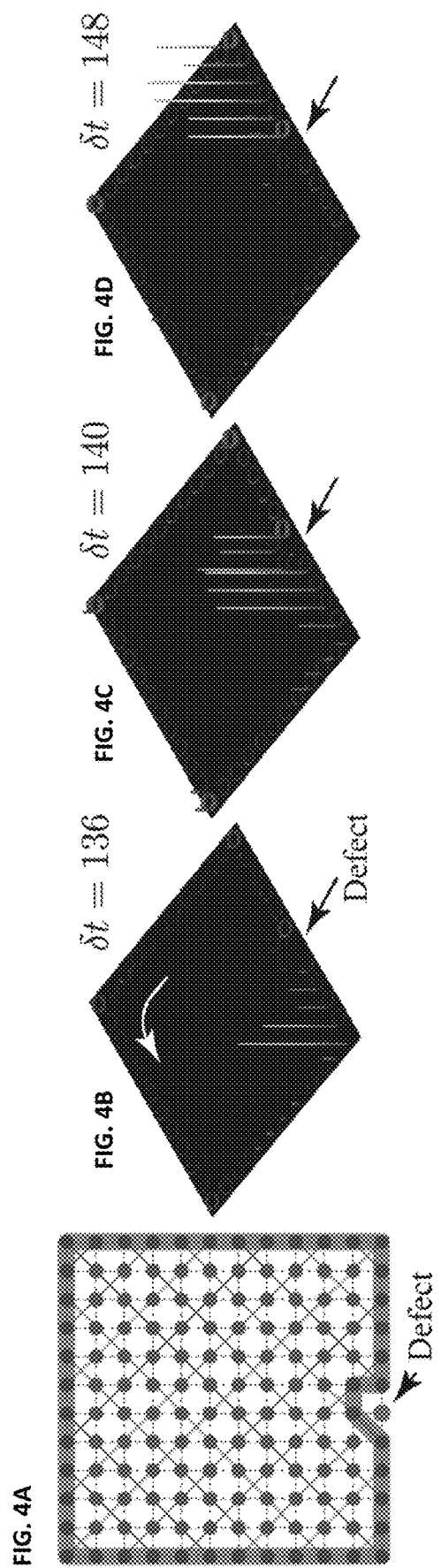

GENERATION OF NESTED FREQUENCY COMBS IN A TOPOLOGICAL SOURCE

CROSS-REFERENCE TO RELATED APPLICATIONS

This application claims priority to and the benefit of the U.S. Provisional Patent Application No. 63/107,784 filed on Oct. 30, 2020, the entire contents of which hereby are incorporated by reference herein.

STATEMENT REGARDING FEDERALLY SPONSORED RESEARCH OR DEVELOPMENT

This invention was made with government support under Grant Number FA95501610323 awarded by the Air Force Office of Scientific Research, N000142012325 awarded by the Office of Naval Research, W911NF1920181 awarded by the United States Army Research Laboratory, and PHY1820938 awarded by the National Science Foundation. The government has certain rights in the invention.

TECHNICAL FIELD

The present invention generally relates to sources of radiation structured as frequency combs and, more particularly, to the generation of frequency combs configured as nested frequency combs in topological sources that include arrays of ring resonators possessing edge states, and frequency combs that remain robust against fabrication disorders.

RELATED ART

As known in related art, the term "frequency comb" is conventionally used to refer generally to a radiative output (and/or the frequency spectrum of such output) from a source of radiation (e.g., a laser source, as one non-limiting example) that is represented by a series of discrete, equally spaced frequency lines. Optical frequency combs, for example, can be generated by a number of mechanisms, including periodic modulation (in amplitude and/or phase) of a continuous-wave laser, four-wave mixing in nonlinear media, or stabilization of the pulse train generated by a mode-locked laser.

Optical frequency combs find a multitude of applications in metrology, spectroscopy, and precision clocks, for example. While optical frequency combs emerge naturally in mode-locked ultra-fast lasers, using nonlinear parametric processes such as the Kerr effect in integrated photonics resonators offers a much more convenient and compact route to generate optical frequency combs and to realize, for example, on-chip transceivers for tera-bit scale wavelength-multiplexed optical communications, chip-scale light detection and ranging (LiDAR), on-chip frequency synthesizers, and optical clocks.

One of the operational regimes of interest is coherent optical frequency combs where the intrinsic dispersion and dissipation of a photonic resonator are counterbalanced by the nonlinearity induced dispersion and parametric gain, respectively, leading to self-formation of stationary solutions typically referred to as dissipative Kerr solitons (DKS). DKS have been demonstrated in a variety of single resonator geometries and diverse material platforms such as silica glass and silicon nitride. The deficiencies of using the single-resonator-based source of a frequency comb-like radiation (e.g., such as that schematically illustrated in FIG. 1A) are well recognized and include at least (1) low efficiency (less than 5%, as measured by the ratio of the comb power generated at the output to the power of the pump radiation), and (2) rather extreme dependence of the desired output on the operational conditions.

SUMMARY

Embodiments of the present invention provide a method that includes a step of receiving (via at least one input port of a multidimensional array of evanescently coupled constituent ring resonators) pump radiation from at least one radiative pump system (here, the array includes the at least one input port, and at least one output port). The array may possess a transmission spectrum that contains a first group of transmission bands (including a first transmission edge band between first and second respectively corresponding transmission bulk bands) and a second group of transmission bands (including a second transmission edge band between third and fourth respectively corresponding transmission bulk bands) such that these first and second groups are separated from one another by a first frequency range. (In one specific implementation, the transmission spectrum includes a repeating group of transmission bands, which group includes a transmission edge band sandwiched between two transmission bulk bands, and where the frequency separating the repeated groups is a first frequency range.

The embodiment further includes the step of producing, via the at least one output port, a first radiative output by circulating energy of the pump radiation in an edge state around a peripheral region of the array that is configured as a closed-loop waveguide resonator. In the embodiment, for a chosen first power and first frequency of the pump radiation, the first radiative output includes a series of groups of pulses of radiation, pulses of radiation within each of the groups of pulses of radiation are delayed with respect to one another by a first delay time substantially equal to a round-trip time of propagation of the pump radiation through the constituent ring resonator, and the groups of pulses of radiation are delayed with respect to one another by a second delay time substantially equal to the round-trip time of propagation of the pump radiation in the edge state around the peripheral portion of the array.

Alternatively or in addition, in any of the above embodiments, the multidimensional array of evanescently coupled constituent ring resonators may include a multiplicity of site ring resonators and link ring resonators arranged such that, in each column and each row of the array, the site ring resonators and the link ring resonators alternate with one another. Alternatively or in addition, and substantially in every of the embodiments, the peripheral region of the array that circumscribes a central region of the array is configured as the closed-loop waveguide formed by the constituent ring resonators disposed at least in first and last columns of the array and at least in first and last rows of the array. (In at least one specific case, the step of producing a first radiative output does not include propagating of the pump radiation through the central region when the spectral frequency of the pump radiation is within the at least one transmission edge band.

Alternatively or in addition, and substantially in every embodiment, the process of circulating energy of the pump radiation in an edge state around a peripheral region of the array includes circulating pump radiation around the peripheral region and/or circulating a pump radiation around at least one of the constituent ring resonators of the array simultaneously with the circulating of the pump radiation around the waveguide forming the peripheral region of the array. In at least one of the above-described embodiments, the process of producing the first radiative output includes producing the first radiative output having a frequency spectrum that includes multiple discrete frequency bands separated from one another by a frequency gap defined by a free spectral range (FSR) of a constituent ring resonator of the array (here, each of said multiple frequency bands includes a series of frequency combs), thereby generating a series of edge mode resonance oscillating within each FSR or each of the constituent ring resonators of the array. In substantially every embodiment, the process of circulating pump energy may include maintaining a propagation of this pump energy along the peripheral region only when a spectral frequency of said pump energy is within the at least one transmission edge band.

In one specific embodiment, the process of producing the first radiative output includes producing the series of groups of light pulses with respectively-corresponding phases that are locked with respect to one another and/or, when the at least one input port includes multiple input ports, the process of receiving may include receiving first pump radiation at a first input port from the multiple ports and receiving second pump radiation at a second input port from the multiple ports (here, the process of producing a first radiative output includes producing first and second radiative outputs by at least circulating the first pump radiation in the edge state in a first direction around the closed-loop waveguide resonator while circulating the second pump radiation in the edge state in a second direction around the closed-loop waveguide resonator, the first and second directions being opposite to one another).

In at least one specific implementation, the transmission edge bands of the transmission spectrum of the array are characterized by a substantially linear dispersion, while the transmission bulk bands are characterized by a substantially random dispersion and/or the process of circulating may include circulating energy radiation around the peripheral region of the array such that a dispersion of longitudinal modes of so-circulating radiation is compensated by a dispersion induced in the peripheral region by Kerr nonlinearity.

In some embodiments, the method may include producing (via the at least one output port) an auxiliary radiative output representing the so-called Turing rolls by circulating light energy of the pump radiation in an edge state around a peripheral region of the array that is configured as a closed-loop waveguide resonator. Such auxiliary radiative output, for chosen auxiliary power and auxiliary frequency of the pump radiation, includes a series of pulses of radiation delayed with respect to one another by an auxiliary delay time that is shorter than the first delay time and that is defined by an integrated dispersion of the constituent ring resonators of the array. Here, a frequency spectrum of the auxiliary radiative output includes a single edge mode oscillating in each FSR of the constituent ring resonators of the array.

BRIEF DESCRIPTION OF THE DRAWINGS

The idea of the invention and wxamples of the present disclosure will be appreciated and understood by referring to the following Detailed Description of some of Embodiments in conjunction with the not-to-scale Drawings, of which:

FIG. 1A: Schematic of a single-ring resonator. FIG. 1B: power spectrum of the single-ring resonator in the linear regime. FIG. 1C: Temporal and spectral responses at the output of the single ring resonator in the regime of a single Kerr soliton. The temporal output includes a series of pulses separated by TR, which is the round trip time of the single ring resonator. The spectral output includes a series of narrow lines separated by FSR $\Omega R$. FIG. 1D: An indicative spatio-temporal intensity distribution in the ring, showing different operating regimes as a function of input pump frequency detuning $\delta\omega p$ from the cold-cavity resonance. FIG. 1E: A schematic of a 2D array of constituent ring resonators configured to simulate the anomalous quantum-Hall model for photons and exhibits topological edge modes at its boundary. FIG. 1F: Power spectrum of the embodiment of FIG. 1E in the linear regime showing edge state resonances (shaded) and bulk bands. The edge states extend throughout the boundary of the lattice and constitute a super-ring resonator, with longitudinal mode separation ISR. The transmission spectrum repeats every FSR $\Omega_R$ of the individual ring resonators. FIG. 1G: Plots representing temporal and spectral distributions of the radiative output (the topological frequency comb) generated by the embodiment of FIG. 1E in the single nested soliton regime.

FIGS. 2A, 2B, 2C, 2D, 2E, 2F, 2G, 2H, 2I, 2J, 2K, and 2L illustrate operation of a topological comb in the regimes of Turing rolls and chaos. Here, FIG. 2A illustrates total pump power in the super-ring resonator as a function of the input pump frequency detuning $(\omega_p-\omega_0)/J$, with normalized input pump field E=1.1. FIG. 2B depicts spectral power of the generated frequency comb $2\kappa_{ex}|a_{IO,\mu}|^2$ in different FSRs (indexed by $\mu$, the fast frequency). FIG. 2C: Total pump power in the super-ring resonator, for pump frequencies in one of the edge state resonances. FIG. 2D: Spatio-temporal (or fast-time) intensity distribution in the ring resonators, integrated over the rings on the edge of the lattice, $\Sigma_{\{m\in edge\}} |\tilde{a}_{m,\tau}|^2$ as a function of the pump frequency detuning. This plot can be compared with that of a single ring resonator, shown in the inset of FIG. 1A. Analysis is performed for two different pump frequencies, $\delta\omega_{p1}$=0.111 J and $\delta\omega_{p2}$=0.08 J as indicated in FIGS. 2C and 2D. FIGS. 2E, 2F: Spatial intensity distribution in the lattice. FIGS. 2G, 2H: Output comb spectra at $\delta\omega_{p1}$ and $\delta\omega_{p2}$, in the regimes of phase-locked Turing rolls and chaos, respectively. The insets show slow frequency spectra for a given longitudinal mode $\mu$. For plotting the comb spectra, $\Omega_R$ was chosen to be 20. FIGS. 2I, 2J: Slow frequency spectra. FIGS. 2K, 2L: Slow-time temporal profiles at the output, for pump frequencies $\delta\omega_{p1}$ and $\delta\omega_{p2}$, respectively.

FIGS. 3A, 3B, 3C, 3D, 3E, 3F, 3G, 3H, 3I, 3J, and 3K illustrate operation of a topological comb in the nested solution regime. FIG. 3A shows Spatio-temporal (or fast-time) intensity distribution integrated over edge rings, and FIG. 3B shows total pump power in the super-ring resonator, as a function of input pump frequency, with input pump field E=1.56. FIGS. 3C and 3D depict spatial intensity profiles in the lattice at $\delta\omega_{p3}$, for two different slow times, showing propagation of a single nested soliton. The inset shows the phase (or position) of the soliton which is the same in each ring resonator. FIGS. 3E and 3F represent propagation of two nested solitons at pump frequency $\delta\omega_{p4}$. The phases of the solitons in individual rings (shown in the insets) are different in the two nested solitons. FIGS. 3G and 3H demonstrate corresponding temporal profiles at the output.

FIGS. 3I and 3J show output comb spectra for the two pump frequencies. The inset in FIG. 3I shows slow-frequency spectrum where multiple equidistant edge modes are oscillating. FIG. 3K illustrates slow-frequency spectrum at $\delta\omega_{p3}$, showing oscillation of individual edge mode resonances with an effectively linear dispersion.

FIGS. 4A, 4B, 4C, and 4D illustrate the robustness of the topological comb generated in accordance with embodiments of the present disclosure. FIG. 4A is a schematic of the lattice/array with a deliberately located defect on the boundary. FIGS. 4B, 4C, and 4D address robust propagation of single nested soliton around the defect, at different slow times, without any scattering into the bulk.

Figure 1D:
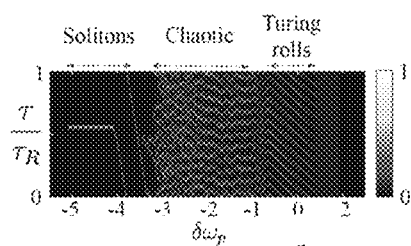
FIGS. 1A, 1B, 1C, 1D, 1E, 1F, and 1G illustrate the working of the topological frequency comb methodology configured according to an embodiment of the invention in comparison with the generation of the frequency comb with the use of a single ring resonator.

Generally, the sizes and relative scales of elements in Drawings may be set to be different from actual ones to appropriately facilitate simplicity, clarity, and understanding of the Drawings. For the same reason, not all elements present in one Drawing may be shown in another.

DETAILED DESCRIPTION

In accordance with preferred embodiments of the present invention, methods, and apparatus are disclosed for the generation of radiation of frequency combs of radiation and temporal Kerr solutions in a multidimensional array of evanescently coupled ring resonators and, in particular, of radiation with a spectrum judicially structured as a nested frequency comb.

Specifically, the inability of single-ring resonator-based devices to generate frequency combs of radiation (e.g., optical radiation, or radiation in a THz frequency, or radio-frequency (RF) waves) outside of the limitations imposed on the spectrum of such combs by the free spectral range (FSR) of a given single-ring resonator is solved by devising a topological waveguide system that includes at least one judiciously-structured multidimensional array or lattice of mutually-coupled ring constituent resonators configured to ensure that:

the frequency spectrum of an edge state of radiation (that propagates only around the peripheral portion (e.g., an edge portion) of the array of the system as a result of appropriately structured radiative pumping of such an array) includes a "supercomb" represented by a series of discrete groups of frequency combs (such groups being substantially equally spaced from one another by a frequency gap defined by the FSR of a constituent ring resonator), thereby defining a series of edge mode resonances oscillating within each FSR of each of the constituent ring resonators;

the temporal profile of the radiative output produced by such an array of the system is defined by nested pulses, that is, by a series of groups of pulses of radiation (which pulses are delayed with respect to one another within a given group by a first delay time substantially equal to the round-trip time for propagation of radiation within the constituent ring resonator) while constituent groups of pulses of radiation are delayed with respect to one another by a second delay time substantially equal to the round-trip time for propagation of radiation in the edge state around the peripheral portion of the array; and such an edge state of radiation propagating through the system remains robust against any defects in the lattice of the device.

A skilled artisan having an advantage of this disclosure will readily appreciate that the proposed solution provides the user with operational flexibility of generating a frequency comb targeting a specific pre-determined frequency, thereby benefiting multiple practical applications, but also facilitate the increase of mode efficiency of at least 10-fold as compared to that of generation of the frequency comb output by a single-ring resonator.

While the discussion is carried out in reference to the optical frequency combs, one skilled in the art will appreciate that this is done only for the purposes of simplicity and definiteness, and that substantially the same methodology can be implemented in a different frequency range—in the RF-range or THz range, to name just a few. Accordingly, the scope of the invention is intended to cover a methodology utilizing radiative sources and methods of handling radiation—substantially regardless of the specific frequency ranges limited to only the identified range(s). In the case of implementation of the idea of the invention in the optical frequency range, the multidimensional array is configured to create a synthetic magnetic field for photons and to exhibit topological edge states. As shown below, topological edge states constitute a travelling-wave super-ring resonator (referred to interchangeably as a peripheral region of the array that is configured as a closed-loop waveguide resonator) that leads to the generation of coherent nested frequency combs, and self-formation of nested temporal solitons and/or Turing rolls that are remarkably phase-locked due to propagation of the radiation over 40 or more constituent ring resonators, in some examples). In the nested soliton regime, the described methodology is shown to achieve a mode efficiency exceeding 50% (which is at least an order of magnitude higher than the efficiency of the conventional system that includes only a single ring resonator, which is theoretically limited to only 5%). The topological nested solitons are robust against defects in the lattice of the multidimensional array. As discussed below, the disclosed topological frequency comb methodology works in a parameter regime that can be readily accessed using existing low-loss integrated photonic platforms such as silicon-nitride.

Examples of Embodiments

Technical description of at least one embodiment of the topological system of the invention—a two-dimensional array of constituent ring resonators—as related to the one used for the purposes of this disclosure, the differentiation between the peripheral or boundary region of such an array (configured as a closed-loop waveguide formed by the constituent suite and link ring resonators, the formation of transmission edge states and transmission bulk states of such an array and conditions on spectral frequency of light capable of propagating through the peripheral region, as well as definitions of various terms used in this disclosure were presented in U.S. patent application Ser. No. 17/326,971 filed on May 21, 2021, the entire contents of which are incorporated herein by reference.

Figure 1A:
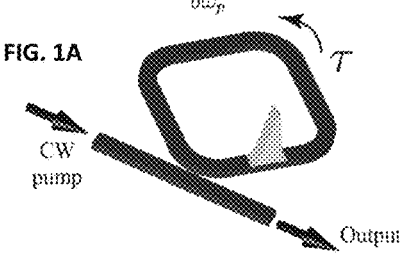
Figure 1E:
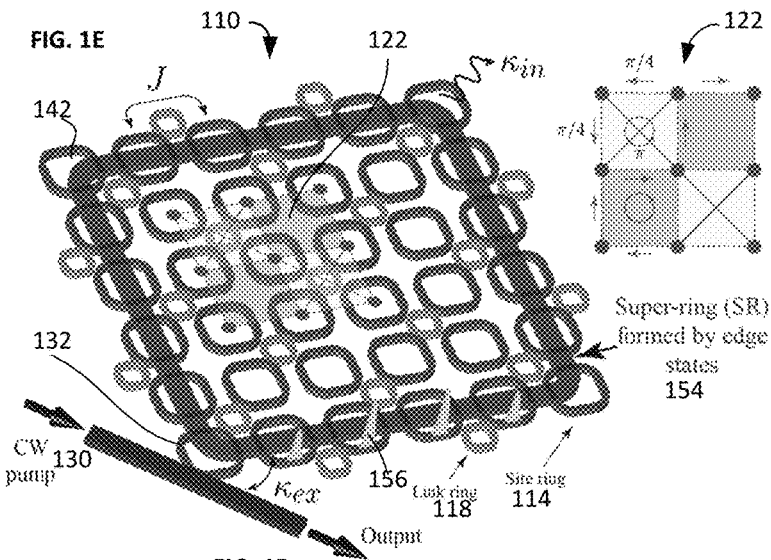
Figure 1B:
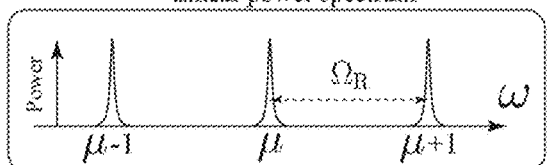

One example of a topological system proposed for use with an embodiment of the invention includes a square lattice with a site ring resonator located at each of its lattice sites, see FIG. 1E.

As is schematically illustrated in FIG. 1E (see also FIG. 1A of U.S. patent application Ser. No. 17/326,971), the embodiment of the source of radiation includes a multidimensional (shown in this case as a two-dimension, or 2D) checkerboard lattice or array 110 (e.g., which may be interchangeably referred to herein as lattice 110 or array 110) of ring resonators 114, 118. The ring resonators 114 are referred to as site ring resonators (or site rings) and are coupled to their nearest and next-nearest neighbors using another set of ring resonators 118 that are referred to as the link rings. The spatial gap(s) between the link and the site rings 118, 114 sets the strength of the evanescent field coupling between the site rings 114 and may be chosen, for example, to be substantially the same for both the nearest and next-nearest neighbor site rings. The resonance frequencies of the link rings 118 are preferably judiciously detuned from those of the site rings 114 by introducing a path length difference such that the detuning is one-half free-spectral range. Therefore, near site-ring resonance frequencies, light intensity in the link rings 118 is negligible and the link rings are configured to act as light waveguides operably connecting site rings 114. More importantly, depending on their position, and as was discussed in U.S. patent application Ser. No. 17/326,971, the link rings 118 introduce a direction-dependent hopping phase between the site rings 114. In the example 110, the link rings 118 are positioned such that the hopping phase between the next-nearest-neighbor site rings 114 is always zero, while that between nearest-neighbor site rings 114 is $+/-\pi/4$. This configuration effectively leads to the realization of a staggered synthetic magnetic field for photons such that the average magnetic flux through a unit cell of two plaquettes (shown as a shaded area 122) of the lattice 110 is zero, as shown in the inset to FIG. 1E, but the flux through a single plaquette is non-zero.

A pump system 130 (for example, a pump laser system) is operably coupled to the input port 132 of the array 110 (as shown—with the use of optical fiber), while the detection electronic circuitry (not shown) is disposed at the output port 142 of the array 110 to receive the light output formed by the pumped array 110. A related embodiment of the device can also contain multiple input and/or multiple output ports.

The lattice 110 simulates the anomalous quantum Hall model for photons, and in the linear regime, the dynamics close to a longitudinal mode resonance of the site rings is described by a tight-binding Hamiltonian which is similar to that of the Haldane model discussed in Ser. No. 17/326,971. Accordingly, its power spectrum (or the energy-momentum band structure) exhibits a topological edge band sandwiched between two bulk bands, see FIG. 1F. The edge states propagate all along the boundary (or super ring, SR, or peripheral region) 154 of the lattice 110 in a single direction set by the pump/input 130, 132 and, therefore, constitute a travelling-wave super-ring resonator.

Accordingly, the array 110 can be viewed as including a central region and a peripheral or boundary region 154 circumscribing the central region, where such peripheral region is configured as a closed-loop waveguide formed by the site and link ring resonators that are disposed at least in first and last columns of the array 110 and at least in first and last rows of the array 110. It is to this peripheral or boundary region that the propagation of light in the edge states is confined (that is, a spectral frequency of such light is within the transmission edge band of FIG. 1F).

Figure 1F:
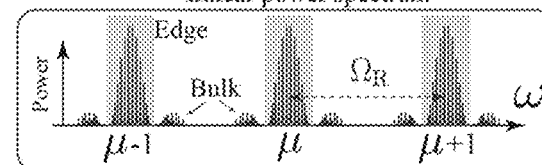
Figure 1C:
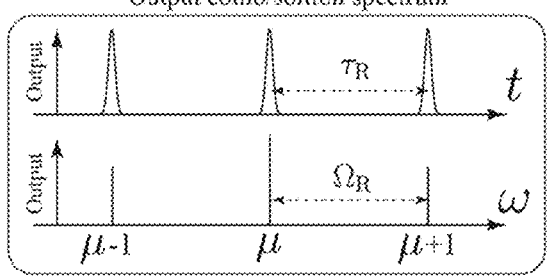

As shown in FIG. 1F, the multiple edge state resonances in the edge band are then the longitudinal modes of the super-ring, separated by a free spectral range $\Omega_{SR}$. The bulk state wavefunctions, in contrast, occupy the bulk or central region of the lattice 110 and do not have a well-defined propagation path in the lattice. Moreover, the edge states are characterized by topologically invariant integers, and are therefore, remarkably robust against defects and disorders in the lattice 110. Furthermore, this structure of an edge band sandwiched between two bulk bands repeats in each FSR $\Omega_R$ of the individual, constituent ring resonators. One skilled in the art will readily appreciate that the super-ring resonator 154 formed by the edge states can be compared to that of a single ring resonator all-pass filter (APF), where each longitudinal mode resonance of the APF is now split into a number of super-modes.

To generate optical frequency combs in this lattice, in one example at least one ring at the edge of the lattice was coupled to an input-output waveguide (as shown in FIG. 1E) and used to inject a continuous-wave (CW) pump laser output at a frequency close to one of the longitudinal mode resonances of the constituent ring resonators (indexed by an integer $\mu=0$). It will be appreciated that in related implementations that the pump can be configured not as a CW-radiation but as a generally pulsed radiation. The intrinsic Kerr nonlinearity of the ring resonators leads to spontaneous four-wave mixing, and subsequently, stimulated generation of photons in other longitudinal modes ($\mu \neq 0$) in the form of a frequency comb.

The generation of optical frequency comb in the lattice is governed by the coupled driven-dissipative nonlinear Schroedinger equations, also called Lugiato-Lefever equations (LLEs) (see, for example, Chembo, Y. K. & Menyuk, C. R. Spatiotemporal Lugiato-Lefever formalism for Kerr-comb generation in whispering-gallery-mode resonators. Phys. Rev. A 87, 053852; 2013) that dictate the complete spatial, spectral and temporal evolution of site ring amplitudes as:

$$\frac{da_{m,\mu}}{dt} = -i(\omega_{0,\mu} - \Omega_R \mu - \omega_p)a_{m,\mu} - J\sum_{\langle n \rangle} a_{n,\mu} e^{-i\phi_{m,n}} - J\sum_{\langle\langle n \rangle\rangle} a_{n,\mu} + \quad (1)$$

$$i\gamma \frac{1}{\tau_R} \int_0^{\tau_R} d\tau (|\tilde{a}_{m,\tau}|^2 \tilde{a}_{m,\tau}) e^{-i\omega\mu\tau} - (\kappa_{ex}\delta_{m,IO} + \kappa_{in})a_{m,\mu} + \delta_{m,IO}\delta_{\mu,0}\mathcal{E}.$$

Here, $a_{m,\mu}$ is the photon annihilation operator for the site ring at a spatial position m, for a given longitudinal mode $\mu$. J is the coupling strength between ring resonators, and is the same for both nearest (indicated by <m, n>) and next-nearest neighbor (indicated by <<m, n>>) couplings. The hopping phase $\phi_{m,n}=\pm\pi/4$ for nearest-neighbor couplings and is zero for the next-nearest neighbor couplings; $\gamma$ is the strength of nonlinear interaction, $\kappa_{ex}$ is the coupling rate of the input-output (IO) ring (at the edge) to the input-output waveguide, and $\kappa_{in}$ is the loss rate of the ring resonators. E is the normalized input pump field which is coupled only to the input-output ring, and in the longitudinal mode $\mu=0$. $\omega_{0,\mu}$ is the resonance frequency of the site ring resonators for a longitudinal mode with index $\mu$ and includes second-order anomalous dispersion $D_2$ such that:

$$\omega_{0,\mu} = \omega_0 + \Omega_R \mu + \frac{D_2}{2}\mu^2. \quad (2)$$

The input pump frequency is denoted by $\omega_p$ and the pumped longitudinal mode corresponds to $\mu=0$ with resonance frequency $\omega_0$. The coupled Eqs. (1) are written in a reference frame rotating at frequency $\omega_R/2\pi$ such that the FSR of the individual ring resonators is an independent parameter. Notably, no assumptions are made regarding the spectral position, bandwidth, or dispersion of the edge state resonances within a longitudinal mode $\mu$.

One skilled in the art will recognize that in Eq.1, the nonlinear four-wave mixing interaction between different longitudinal mode resonances is represented in the time domain $\tau$ (in $[0, \tau_R]$, which corresponds to the round-trip time of pump energy within a single ring resonator. Specifically, in a reference frame rotating at frequency $\Omega_R/2\pi=1/\tau_R$, $\tilde{a}_{m,\tau}$ represents the spatio-temporal field within a ring, at a lattice location m, and is related to the spectral field within the ring as:

$$a_{m,\mu} = \frac{1}{\tau_R} \int_0^{\tau_R} d\tau \tilde{a}_{m,\tau} e^{-i\omega_{0,\mu}\tau}. \quad (3)$$

It is worth emphasizing that the spectral and temporal dynamics of the system, as dictated by Eq.1, involve two disparate frequency and time scales: 1) the fast frequency associated with the longitudinal mode resonances of the individual rings (indexed by $\mu$, separated by $\omega_R$) and corresponding fast time scale $\tau$ in $[0, \tau_R]$ that depicts spatio-temporal field within individual ring resonators, and 2) the slow frequency ($\omega_{slow}$) associated with the longitudinal mode resonances of the super-ring resonator 154 (separated by $\Omega_{SR}$), that is, the frequency response close to a given longitudinal mode resonance of the individual ring resonators, and corresponding slow time $t\sim 1/J$ that depicts the evolution of radiative fields within the super-ring with round-trip time $\tau_{SR}$. While Eqs.1, 3 directly yield the fast-time and fast-frequency response, the Fourier-transform of the slow-time (t) evolution of $\tilde{a}_{m,\tau}$ allows one to reconstruct the slow-frequency ($\omega_{slow}$) spectrum of the topological comb.

As an example, for the numerical simulations, a 12×12 lattice of site rings was chosen, and included 256 FSRs of the individual rings. The dimensionless parameters were used such that the relevant frequency ($\omega_0$, $\mu$, $\omega_p$, $\kappa_{ex}$, $\kappa_{in}$, $\Omega_R$, $D_2$) and time ($\tau_R$, t) scales were normalized by the coupling strength J, and the fields ($a_{m,\mu}$) were normalized by the ratio (effectively, J=1 and $\gamma$=1). In one example, $\kappa_{ex}$=0.05, and $\kappa_{in}$=0.005 were chosen such that the individual edge state resonances in the edge band could be resolved, and $D_2$ was set to 0.00025. When pumped by a CW radiative input near one of the edge mode resonances, the topological super-ring (the peripheral portion of the array of FIG. 1E) under a chosen power and frequency of the pump radiation hosts nested solitons with indicative pulse-like spatial intensity profiles (shown as pulses 156).

Figure 1G:
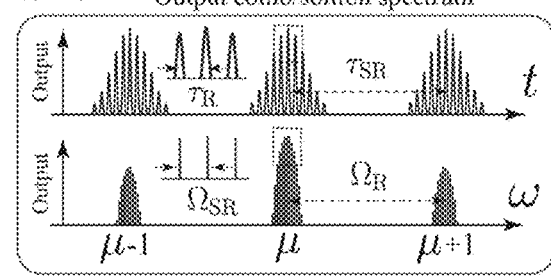

The results are schematically presented in the graphs of FIG. 1G, showing the schematic of the temporal and the spectral output of the topological frequency comb in the single nested soliton regime. The temporal profile of the radiative output acquired at the output port 142 exhibited a series of soliton-like pulses separated by single ring round trip time $\tau_R$ (fast time) and modulated by a series of super-soliton pulses that are separated from one another by the round trip time $\tau_{SR}$ (slow time) of the edge mode super ring (that is, of peripheral region of the array) 154. The spectral profile of the radiative output showed a nested comb, that is, a series (comb) of edge mode resonances (longitudinal modes of the super ring/peripheral regions 154, slow frequency) oscillating in each FSR (fast frequency) of the single ring constituent resonators of the array 110.

One skilled in the art will appreciate that an embodiment of the method of the invention includes a step of receiving (via at least one input port of a multidimensional array of evanescently coupled constituent ring resonators) pump radiation from at least one radiative pump system. The array is configured to have a transmission spectrum that includes, in at least one example embodiment, repeating groups of transmission bands containing a first transmission edge band between first and second respectively corresponding transmission bulk bands, and the successive groups are separated from one another by a first frequency range. The embodiment also includes a step of producing, at the at least one output port, a first radiative output by at least circulating light energy of the pump radiation in an edge state around a peripheral region of the array that is configured as a closed-loop waveguide resonator. In so producing, and for a chosen first power and a first frequency of the pump radiation, the first radiative output includes a series of groups of pulses of radiation. Here, pulses of radiation within each of the groups of pulses of radiation are delayed with respect to one another by a first delay time substantially equal to a round-trip time of propagation of the pump radiation through the constituent ring resonator; and the groups of pulses of radiation are delayed with respect to one another by a second delay time substantially equal to the round-trip time of propagation of the pump radiation in the edge state around the peripheral portion of the array.

Turing Rolls and Collective Coherence

Figure 2A:
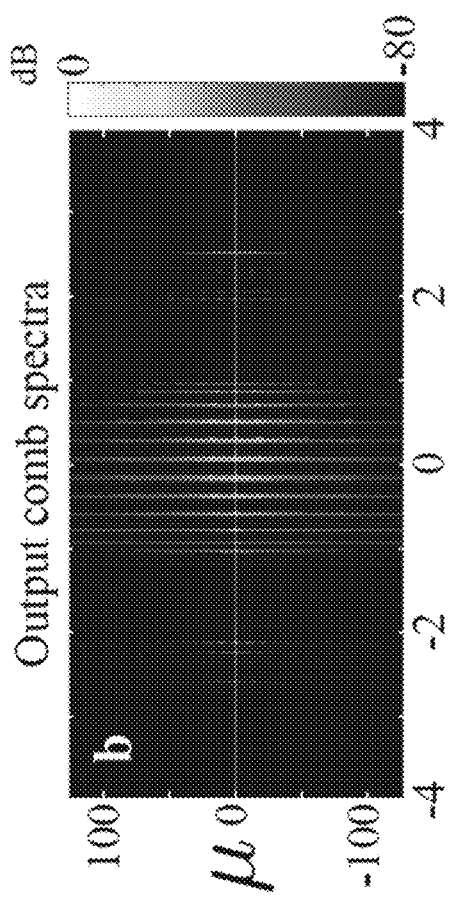
Figure 2B:
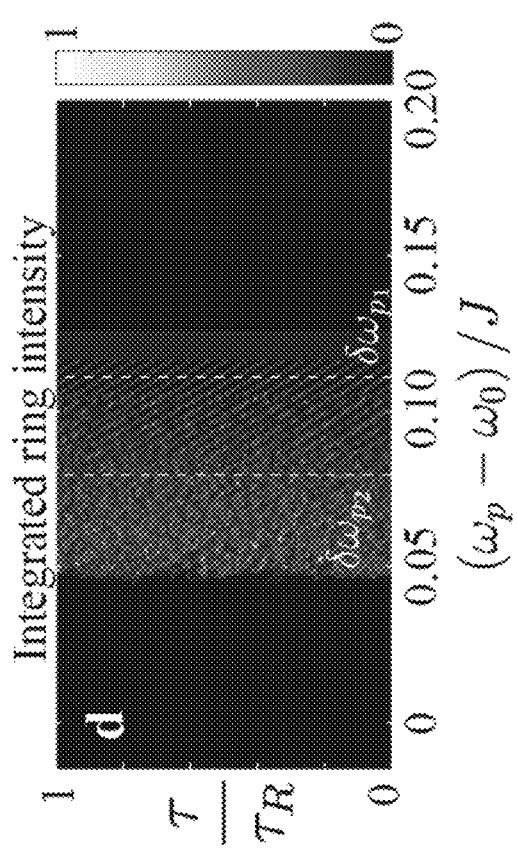

To understand the generation of a frequency comb in the embodiment of FIG. 1E, the (normalized) input pump field was fixed at E=1.1, and the output spectra of generated photons across multiple FSRs (fast-frequency, indexed by $\mu$) was observed as the input pump frequency was tuned in one of the FSRs ($\mu$=0, FIGS. 2A, 2B). It was found that the generation of frequency comb (e.g., bright light intensity across multiple FSRs) is efficient only when the input pump frequency is close to one of the edge mode resonances. Furthermore, as discussed below, on pumping near edge mode resonances, the bright frequency comb is generated only in the ring resonators that lie on the edge of the lattice. In contrast, when the input pump frequency is in the bulk bands, the generation of radiation in FSRs other than the pumped FSR is very weak and the frequency comb is inefficient. This enhanced generation of optical frequency comb in the edge band is due to the travelling-wave super-ring resonator formed by the edge states that efficiently reinforces the optical frequency comb. The bulk states, on the other hand, may not have a well-defined direction of flow of photons in the lattice.

Figure 2C:
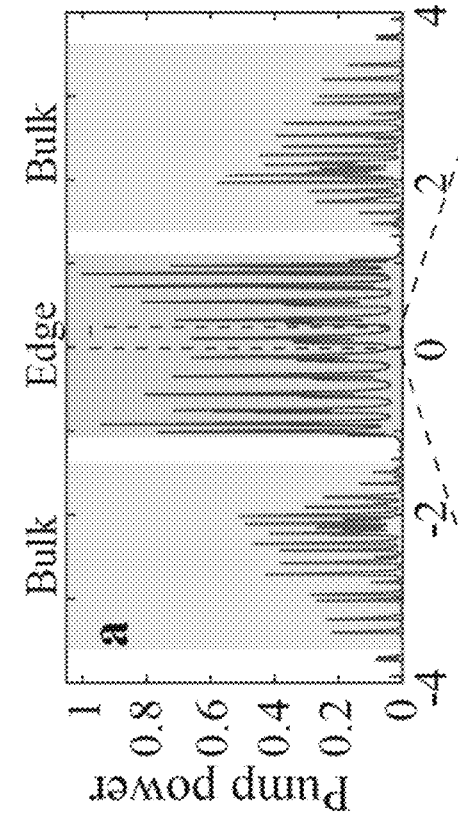
Figure 2D:
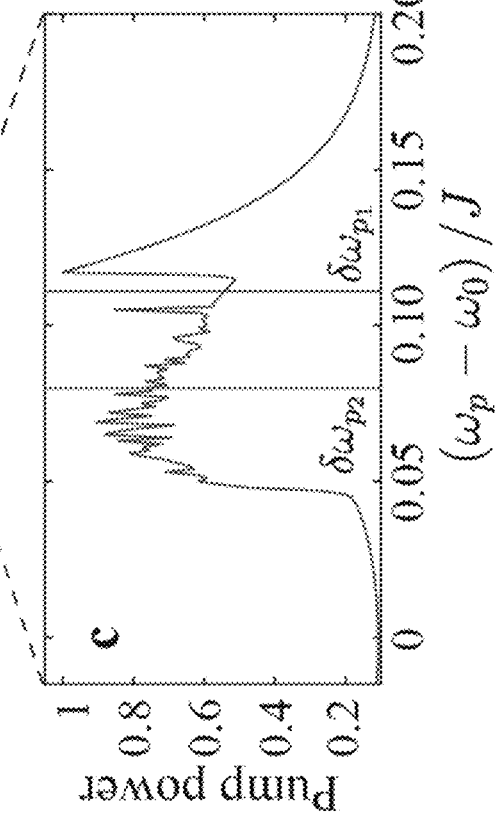

Having established that the topological optical frequency comb is efficient only when the input pump frequencies excite the edge modes, it may be useful to now focus on pump frequencies near a single edge mode of the lattice or array 110. FIG. 2C illustrated the total pump power in the super-ring resonator 154 as a function of the pump frequency detuning. To reveal the self-formation of temporal features, FIG. 2D plots the spatio-temporal intensity distribution integrated over the constituent ring resonators on the edge of the array, as a function of the input pump frequency. The presence of sharp features in this plot indicates both the self-formation of temporal (or equivalently, spatial) features within individual ring resonators and the self-organization of these features across rings. Randomly varying features in this plot represent randomness in the spatial intensity distribution within rings or a lack of coherence between rings. This plot can be compared with the corresponding plot of a single ring resonator frequency comb (shown in FIG. 1D).

When the input pump frequency is at $\delta\omega_{p1}$=0.111 J, in FIG. 2D one can observe a regularly oscillating pattern along the fast-time $\tau$ axis that indicates formation of Turing rolls (see, for example, Kippenberg, T. J., et al., Dissipative Kerr solitons in optical microresonators; Science 361; 2018).

To confirm this finding, in FIG. 2E the spatio-temporal intensity distribution within each ring of the lattice 110 is plotted, that is, where $|\tilde{a}_{m,\tau}=(m_x, m_y)$ indicates location of a chosen ring resonator in the array 110. It is found that the intensity distribution in all the rings on the edge of the lattice exhibit equally spaced pulses, referred to in related art as Turing rolls (or perfect soliton crystals). The intensity in the bulk of the lattice is substantially negligible. Remarkably, it was found that the phase of the Turing rolls is locked throughout the edge of the lattice. This showed self-organization or collective spectro-temporal coherence between all the rings on the edge (peripheral region) 154. In fact, a broad region, of bandwidth≈0.01 J can be defined where coherent Turing rolls are observed.

From FIG. 2C, a person skilled in the art will recognize that the pump power in the super-ring 154 varies smoothly in this region of coherent Turing rolls. For lower pump frequencies (near $\delta\omega p2$ in FIGS. 2C, 2D), one determines a chaotic region where the pump power varies rapidly as we tune the input pump frequency. More importantly, the spatio-temporal intensity distribution within each ring, as well as the distribution across rings, was random without any coherence whatsoever. Notably, the pump frequency is still in the edge band, and consequently, one can observe that the comb intensity is confined to the edge of the lattice 110 and the intensity in the bulk is negligible.

FIGS. 2G and 2H show the output comb spectra for the two pump frequencies $\delta\omega_{p1}$ and $\delta\omega_{p2}$. For $\delta\omega_{p1}$, the frequency comb spectrum predominantly includes discrete spectral lines, separated by 18 FSRs. As in the case of a single-ring frequency comb, this number corresponded to exactly the number of Turing rolls in each ring (FIG. 2E). Furthermore, it was confirmed that the number of Turing rolls decreases as $\sqrt{\gamma/D_2}$. At $\delta\omega_{p2}$, that is, in the chaotic region, the discrete lines in the primary comb are substantially merged together, and there are no distinct features in the frequency spectrum.

Because $\omega_{slow} \approx J \ll \Omega_R$, one can see that the slow-frequency spectrum is not resolved in FIGS. 2G and 2H, which show the spectra along the fast-frequency axis (FSRs, $\mu$). Therefore, to better visualize the slow-frequency response of the topological comb, in FIGS. 2I, 2J the slow-frequency spectrum within each FSR was plotted. Here, the slow-frequency $\omega_{slow}$, (x–axis) was calculated as the detuning from the corresponding longitudinal mode resonance frequency $\omega_{0,\mu}$ and the input pump frequency, such that $\omega_{slow}=\{(\omega_\mu-\omega_{0,\mu})-(\omega_p-\omega_0)\}/J$. $\omega_\mu$ is the frequency of generated light in a longitudinal mode $\mu$.

At $\delta\omega_{p1}$, that is, in the region of coherent Turing rolls (FIG. 2I) the slow-frequency spectrum within each bright FSR (the fast frequency, $\mu$) exhibited a single mode centered around the comb line (also see inset of FIG. 2G for a cross-section of this plot). The oscillation of a single edge mode within each oscillating FSR was found to be consistent with the observation of uniform spatial intensity distribution in FIG. 2E. This could also be inferred from FIG. 2K which shows that the fast-time ($\tau$) intensity distribution at the output remains constant with the evolution of slow-time t.

At $\delta\omega_{p2}$, that is, in the chaotic region, oscillation of multiple modes in the edge band ($\omega_{slow}=(-1, 1)$ J) of each FSR was observed. This oscillation of multiple edge modes in the chaotic regime was also evident from the non-uniformity of the spatial intensity distribution in the lattice (FIG. 2F), and the dynamics of the output temporal profile (FIG. 2L) which varies randomly with slow-time t. Furthermore, spectral power in bulk modes ($\omega_{slow}<-1$ J, and $\omega_{slow}>1$ J) is two orders of magnitude smaller compared to those of the edge modes. This validated the observation of negligible light intensity in the bulk of the lattice (FIG. 2F). Notably, the oscillating edge modes in FIG. 2J also showed the underlying quadratic dispersion of the ring resonators in different FSRs.

Temporal Kerr Super-Solutions.

To show the presence of nested solitons in the radiative output carrying a topological frequency comb, the normalized input pump field was increased to E=1.56, in one non-limiting example. From the spatio-temporal intensity distribution in the super-ring resonator (FIG. 3A), in addition to the coherent Turing rolls and chaotic regions, one skilled in the art can observe a new regime (within the range of 0-0.02 J), where intensity of radiation is confined to very narrow regions (thin strands) in the ring resonators. A quick comparison with the analogous spatio-temporal intensity distribution of a single-ring optical frequency comb (see FIG. 1D) revealed that this region hosts solitons present in the output topological frequency comb. FIG. 3B shows the total pump power in the super-ring resonator 154 where, similarly to a single-ring comb of FIG. 1A, one observes the emergence of kinks in the region where we solitons are expected.

Analysis of two different chosen pump frequencies $\delta\omega_{p3}$=0.007 J and $\delta\omega_{p4}$=0.0135 J was performed in this region, as indicated in the Figure. From the spatial intensity distribution (FIG. 3C), one can see that at $\delta\omega_{p3}$, the topological frequency comb exhibits nested solitons: the intensity distribution along the super-resonator 154 (edge) of the lattice/array 110 is confined to a small region of the edge in the form of a super-soliton, and the intensity distribution within each individual constituent ring of the array is also confined to a narrow region in the form of a soliton. This nested soliton can be shown to then circulate along the edge portion 154 of the lattice 110 in a counter-clockwise direction as the slow-time t evolves. Remarkably, the spatio-temporal phase of the solitons in individual rings of the super-soliton was locked (see inset of FIG. 3C) as this nested soliton structure circulated around the edge of the lattice. This observation once again highlighted the collective coherence or self-organization of multiple nonlinear ring resonators on the edge of the lattice. The corresponding temporal spectrum (FIG. 3G) at the output of the topological frequency comb then showed pulses of radiation that are separated by $\tau_{SR}$ (which is the round-trip time of propagation of radiation along the super-resonator formed by the closed-loop waveguide/super ring 154). Notably, these simulations were carried out in a reference frame that is rotating at frequency $\omega_R/2\pi$, that is, co-propagating with the solitons in individual constituent ring resonators 114. Therefore, the solitons in each ring are circulating with time period $\tau_{SR}$, and each super-soliton pulses in FIG. 3G is actually a burst or group of pulses separated by time-delay $\tau_{SR}$ from the nearest group of pulses (see FIG. 1G).

At input pump frequency $\delta\omega_{p4}$, one observes two sets of nested solitons that are simultaneously circulating along the edge of the lattice (FIG. 3E, 3F). Furthermore, while the phases of the individual ring solitons within each nested soliton were locked, the corresponding phases in the two nested solitons were not the same (see insets of FIGS. 3E, 3F). In contrast to a single nested soliton, the temporal spectrum at the output of the topological frequency comb, in this case, included two bursts of pulses in each round trip time $\tau_{SR}$ of the super-ring resonator 154. At other pump frequencies in the super-soliton region, one can also observe three nested solitons.

Now presented is a discussion of the frequency spectrum at the output of the topological frequency comb in reference to FIGS. 3I, 3J. In the case of a single nested soliton (that is, at the pump frequency of $\delta\omega_{p3}$) the output frequency spectrum is, in general, smooth thereby indicating that it is substantially phase-locked. By contrast, in the case of two nested solitons (that is, when the pump radiation frequency is $\delta\omega_{p4}$) the frequency spectrum shows small variations (FIG. 3J). This behavior of the frequency spectra is similar to that observed in single ring resonator frequency combs of related art, where the spectrum is phase-locked only when there exists a single soliton in the ring.

Furthermore, by resolving the slow-frequency ($\omega_{slow}$) response of the produced topological comb (FIG. 3K), one finds multiple edge modes that are oscillating within each FSR (also see inset of FIG. 3I). More importantly, one skilled in the art will observe that the oscillating edge modes are equally-spaced within a given FSR and across all FSRs, that is, the intrinsic (linear) dispersion of the longitudinal modes (of both the individual ring resonators 118 and the super-ring resonator 154) has now been exactly canceled or compensated by the dispersion induced by Kerr nonlinearity. Therefore, the frequency spectrum in the regime of a single nested soliton indeed corresponds to that of a coherent nested frequency comb (see FIG. 1G). The slow-frequency response also explains the emergence of kinks in the FIG. 3I—these are the regions where the dispersion curves from two different edge modes interfere and lead to phase jumps in the otherwise coherent frequency comb. This slow-frequency spectrum in the soliton regime can be compared to that of the chaotic regime (FIG. 2J), where multiple modes in the edge band are oscillating but there is no cancellation or compensation of dispersion and no phase coherence.

One skilled in the art will appreciate, a figure of merit for radiative frequency combs operating in the single soliton regime may be the mode efficiency at the output of the device, that is, the fraction of power that resides in the comb lines other than the pumped mode. For a single-ring resonator optical frequency combs, the mode efficiency in the single-soliton regime is limited to 5%, irrespective of the length, quality factor, or the material of the resonator (see, for example, Xue, X., et al., Microresonator Kerr frequency combs with high conversion efficiency, in Laser & Photonics Reviews 11, 1600276; 2017, or Bao, H. et al. Laser cavity-soliton microcombs, in Nat. Photonics 13, 384-389; 2019). This is because the pulse width of a single soliton is much smaller than the round-trip time of the resonator, which leads to a very small temporal overlap with a continuous-wave pump.

In stark and advantageous contradistinction, in the single nested soliton regime of the topological comb produced according to an embodiment of the present disclosure, one skilled in the art observes that, in the considered example, more than 50% (in fact, about 53%) of the total output power (in the waveguide) is contained in comb lines other than the pumped edge mode. This mode efficiency is at least an order of magnitude higher than that of single-ring resonators of related art, and is due to the fact that a single nested soliton pulse (in the super-ring 154) spans multiple phase-locked constituent ring resonators 118, with each ring 118 supporting its own single soliton pulse (see in FIG. 1E as 156). This topology enhances the temporal overlap of the nested soliton pulse with the pump. Notably, a single-ring comb can also achieve higher efficiency when multiple solitons are present in the ring resonator (at least according to Kippenberg, T. J., et al., Dissipative Kerr solitons in optical microresonators, in Science 361; 2018). However, in this case, the phase (related to a position along the ring) of each soliton pulse is different, and therefore, the comb spectrum is not smooth. In the current case of a topological nested soliton, on the other hand, a single constituent ring 118 hosts a single soliton, and the phases of the solitons across multiple rings are exactly the same (locked in with one another), which leads to a smooth spectrum (see FIG. 3G). Notably, the theoretical limit on the conversion efficiency of the considered topological nested frequency comb (in the single nested-soliton regime) could be even higher than the observed 53% for different parameter regimes.

In the linear regime, the edge states have been demonstrated to be topologically protected against defects in the lattice of the array (see, for example, Hafezi, M., et al., Imaging topological edge states in silicon photonics, in Nature Photonics 7, 1001, 2013; or Mittal, S., et al., Photonic anomalous quantum hall effect, in Phys. Rev. Lett. 123, 043201, 2019). To investigate whether the edge states preserve their robustness in the nonlinear regime as well, the propagation of nested solitons in the presence of a deliberately located point defect in the lattice 110 was further explored. Specifically, one of the site-ring resonators 118 on the edge of the lattice was detuned by 20J (FIG. 4A) such that this constituent resonator was effectively decoupled from the rest of the lattice 110. FIGS. 4B, 4C, and 4D illustrate slow-time evolution of the observed single nested soliton in such a "defective" lattice, showing that the nested soliton simply routed around the defect as it circulates along the boundary of the lattice, without losing its phase coherence. No pulses of radiation that are reflected back from the defect or scattered into the bulk of the lattice could be observed. This showed that the demonstrated nested solitons were indeed topologically robust against defects in the lattice.

Figure 5:
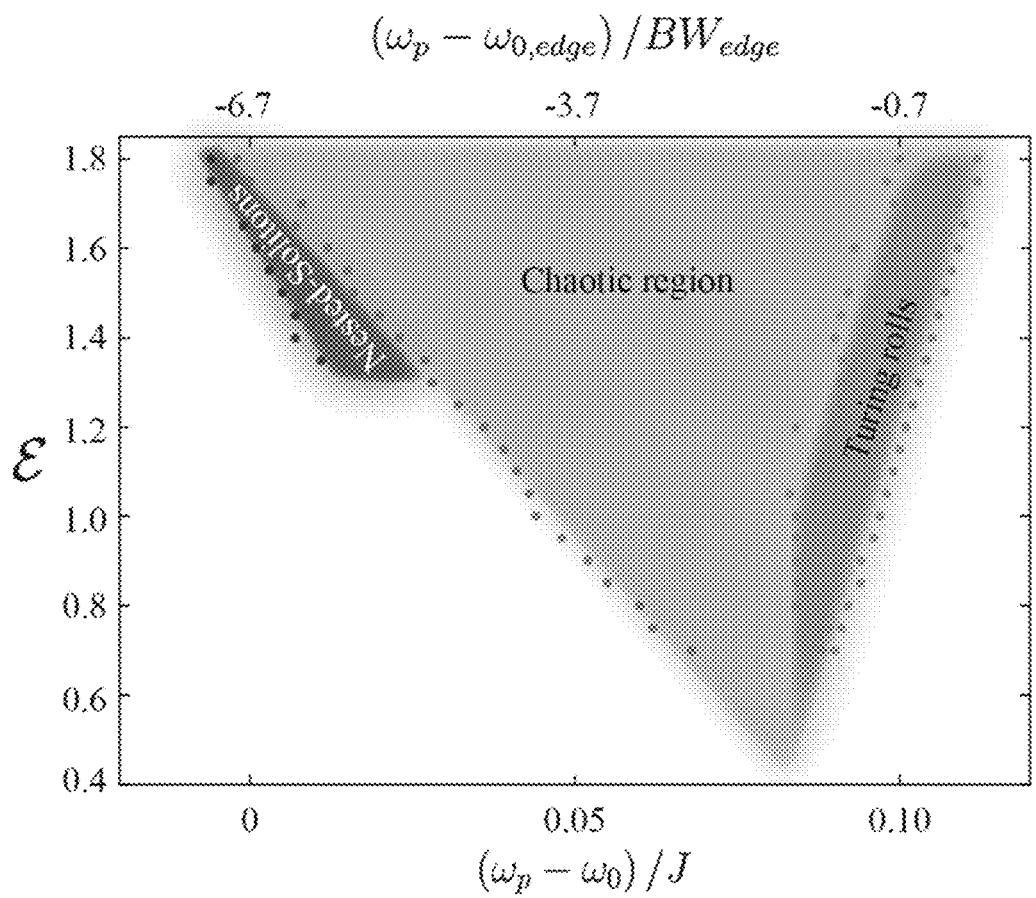
FIG. 5 is a qualitative phase map or diagram of the topological frequency comb generated according to an embodiment of the invention. Different operating regimes of the topological comb are shown as a function of the input pump frequency and pump power. The dots indicate numerical simulation results.

Overall, it is appreciated that the emergence of coherent temporal features such as Turing rolls and nested solitons, and the characteristics of the nested frequency comb in the demonstrated topological super-ring resonator closely resembles that of a single ring resonator frequency comb in the anomalous dispersion regime. This allows one skilled in the art to qualitatively depict the phase diagram of the demonstrated topological frequency comb as shown in FIG. 5 (the qualitative phase diagram of FIG. 5 was estimated for a chosen value of dispersion, in one of the edge mode resonances near the center of the edge band).

Performing numerical simulations at different pump powers (E) and using spatio-temporal (fast-time) intensity distributions integrated over the edge rings (similar to FIGS. 2D and 3A), one can locate those regions of pump frequency detuning that lead to Turing rolls, chaos, and the target nested solitons. On the phase diagram of FIG. 5, also is indicated (upper X-axis) the pump frequency detuning from the respective cold-cavity (linear) edge mode resonance ($\omega_{o,edge}$) normalized by its bandwidth ($BW_{edge}$).

Here, similar to the case of a single ring resonator (see FIG. 1D) one observes Turing rolls at low pump powers and for pump frequencies near the cold-cavity edge resonance ($\omega_{o,edge}$). In this regime, the longitudinal modes of the individual constituent rings of the array 110 are phase-locked, which manifested as phase-locking of the Turing rolls across rings. However, only a single mode of the super-ring resonator 154 is excited (see FIGS. 2G, 2I).

At pump frequencies further away from the cold-cavity edge resonance, one observes a chaotic regime where multiple longitudinal modes of the super-ring resonator are excited in each longitudinal mode of the constituent single-ring resonators. But these modes are not phase-locked. Notably, in the chaotic regime, the pump frequency and the intensity distribution in lattice 110 still corresponds to those of the edge states. This clearly indicated that exciting the edge states of the system does not lead to self-organization or phase-locking.

The nested soliton region appears at input pump power $E \approx 1.3$, and at pump frequencies that are far red-detuned from the cold-cavity edge resonance. In this regime, both sets of longitudinal modes (those of the single rings 118 and the super-ring 154) are phase-locked. Furthermore, one discovers that the soliton region narrows down, and completely disappears at higher pump powers, probably leading to another chaotic regime.

Figure 6:
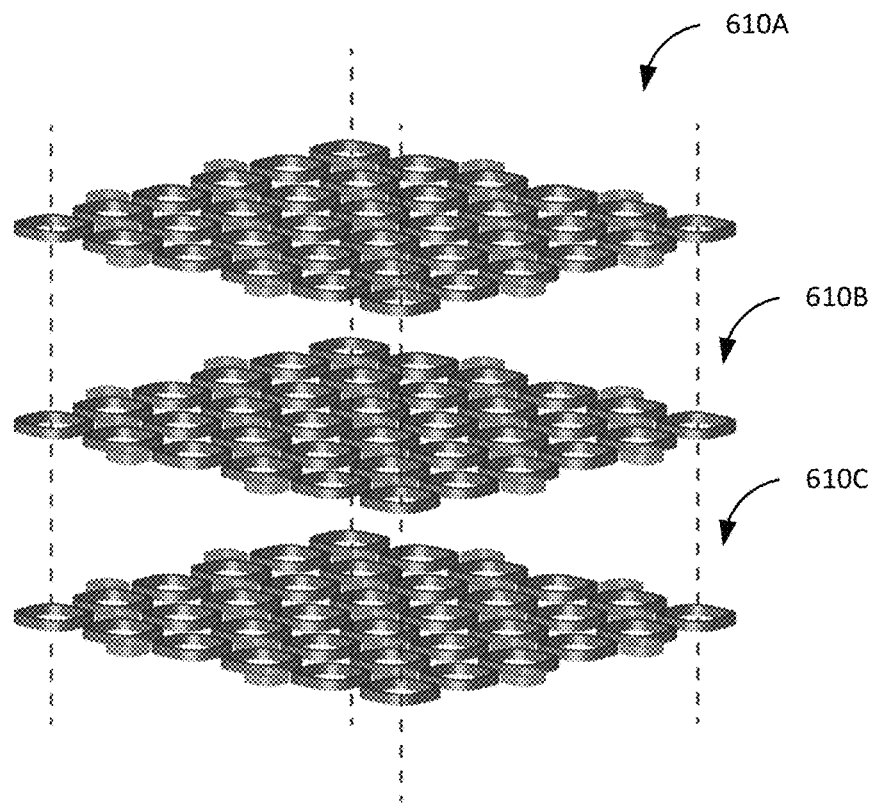
FIG. 6 is a schematic of a system containing multiple topological sources, each of which is configured according to an embodiment of the invention, for use in the generation of a three-dimensionally-structured array of radiative outputs carrying topological frequency combs.

Based on the discussed specific implementation of the idea of the invention, one can expect the appearance of various other phases that could emerge from the excitation of edge and bulk modes. For example, and regardless of a degree of efficiency of the generation of the frequency comb-like type output when the input pump frequency is chosen in the bulk bands, of the transmission spectrum of a multidimensional array of the evanescently coupled constituent ring resonators, the generation of an ancillary radiative output (that includes a series of groups of pulses) as a result of pumping the array of constituent ring resonators with pump radiation the frequency of which corresponds to a bulk state remains within the scope of the invention. Examples of such ancillary radiation output include that (for chosen ancillary frequency of said pump radiation that corresponds to the bulk state and/or ancillary power of the pump radiation) possessing a frequency spectrum containing at least a bulk state mode that oscillates in substantially equally spaced FSRs of the constituent ring resonators. In the limit of weak pump powers, the demonstrated results could pave the way for generation of quantum-optical frequency combs and photonic cluster states entangled in higher dimensions using frequency-time multiplexing. The disclosed methodology could be translated to other frequency regimes of the electromagnetic spectrum, for example, to the microwave domain using a circuit QED platform to implement topological arrays of coupled resonators. Alternatively, or in addition, other topological lattice models to engineer the band structure, and thereby, the dispersion of edge and bulk states. One example may be provided by evanescently coupled multiple 2D arrays (shown as 610A, 610B, 610C) of constituent ring resonators (whether of the same size or different sizes and generally disposed in various spatial orientations with respect to one another), as schematically shown in FIG. 6. Moreover, the disclosed methodology may be implemented with the use of topological structures configured beyond Euclidean geometries to explore the hierarchy of solitons in non-Euclidean curved space, for example, the hyperbolic lattices. Results demonstrated in this disclosure open the route to engineer nonlinear parametric processes, spontaneous-formation, and self-organization of temporal solitons using synthetic magnetic fields and topological design principles.

For the purposes of this disclosure and the appended claims, the use of the terms "substantially", "approximately", "about" and similar terms in reference to a descriptor of a value, element, property, or characteristic at hand is intended to emphasize that the value, element, property, or characteristic referred to, while not necessarily being exactly as stated, would nevertheless be considered, for practical purposes, as stated by one skilled in the art.

These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by one of skill in the art.

In some examples, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While a particular arrangement of ring resonators was used here to achieve topological edge states, it is to be understood that, within the scope of invention, the arrangement of rings could vary to implement a different topological model.

While a particular shape of the ring resonators was used here, a ring resonator is defined to be any closed-loop geometry, including that of a circle, racetrack, rectangle, triangle, hexagon, etc.

While specific values chosen for discussed embodiments are recited, it is to be understood that, within the scope of the invention, the values of parameters may vary over wide ranges to suit different applications. While examples of the present disclosure are described through the embodiments provided above, it will be understood by those of skill in the art that modifications to, and variations of, the illustrated embodiments may be made without departing from the concepts disclosed herein. Disclosed aspects, or portions of these aspects, may be combined in ways not listed above. Accordingly, aspects of the present disclosure should not be viewed as being limited to any of the disclosed embodiments.

What is claimed is:

1. A method comprising:
receiving, at at least one input port of a multidimensional array of evanescently coupled constituent ring resonators, pump radiation from at least one radiative pump system,
wherein the array includes the at least one input port, and at least one output port, and
wherein the array has a transmission spectrum that comprises:
a repetition of a group of transmission bands that includes a first transmission edge band between first and second respectively corresponding transmission bulk bands, and
wherein successive groups from said repetition are separated from one another by a first frequency range; and
producing, at the at least one output port, a first radiative output by circulating the pump radiation in an edge state around a peripheral region of the array that is configured as a closed-loop waveguide resonator,
wherein, for a chosen first power and a chosen first frequency of said pump radiation, said first radiative output includes a series of groups of pulses of radiation,
wherein pulses of radiation within each of the groups of pulses of radiation are delayed with respect to one another by a first delay time substantially equal to a round-trip time of propagation of the pump radiation through a constituent ring resonator, and
wherein the groups of pulses of radiation are delayed with respect to one another by a second delay time that is substantially equal to the round-trip time of propagation of the pump radiation in the edge state around the peripheral region of the array.

2. The method according to claim 1, wherein said producing the first radiative output includes producing the first radiative output having a frequency spectrum that includes multiple discrete frequency bands separated from one another by a frequency gap defined by a free spectral range (FSR) of a constituent ring resonator of the array, thereby generating a series of edge mode resonance oscillating within each FSR or each of the constituent ring resonators of the array, wherein each of said multiple frequency bands includes a series of frequency combs.

3. The method according to claim 1, further comprising:
producing, at the at least one output port, an auxiliary radiative output by circulating the pump radiation in the edge state around a peripheral region of the array that is configured as the closed-loop waveguide resonator,
wherein, for a chosen auxiliary power and a chosen auxiliary frequency of said pump radiation, said auxiliary radiative output includes a series of pulses of radiation delayed with respect to one another by an auxiliary delay time that is shorter than the first delay time and that is defined by an integrated dispersion of the constituent ring resonators of the array, and
wherein a frequency spectrum of the auxiliary radiative output includes a single edge mode oscillating in substantially equally spaced free spectral ranges (FSRs) of the constituent ring resonators.

4. The method according to claim 3, wherein said producing the auxiliary radiative output includes multiple equally spaced pulses of radiation circulating in each of the constituent ring resonators of the peripheral region of the array, and
wherein the multiple equally spaced pulses of radiation circulating each constituent ring resonator on the peripheral region of the array are phase-locked.

5. The method according to claim 1,
wherein the multidimensional array of evanescently coupled constituent ring resonators includes a multiplicity of site ring resonators and link ring resonators, and
wherein, in each column and each row of the array, the site ring resonators and the link ring resonators alternate with one another.

6. The method according to claim 1, wherein the array includes said peripheral region of the array and a central region of the array circumscribed by the peripheral region, and
wherein the peripheral region is configured as the closed-loop waveguide resonator formed by the constituent ring resonators disposed at least in first and last columns of the array and at least in first and last rows of the array.

7. The method according to claim 1, further comprising:
circulating said pump radiation around at least one of the constituent ring resonators of the array.

8. The method according to claim 1, wherein said circulating the pump radiation in an edge state around a peripheral region of the array includes circulating pump radiation around said peripheral region.

9. The method according to claim 1, wherein said circulating includes maintaining a propagation of said pump radiation along the peripheral region only when a spectral frequency of said pump radiation is within at least one transmission edge band.

10. The method according to claim 1, wherein said producing does not include propagating of the pump radiation through a central region of the array when the first frequency of the pump radiation is within at least one transmission edge band.

11. The method according to claim 1, wherein said producing includes producing the series of groups of light pulses and groups of frequency lines with respectively-corresponding phases that are locked with respect to one another.

12. The method according to claim 1,
wherein the at least one input port includes multiple input ports,
wherein said receiving includes receiving first pump radiation at a first input port of the multiple input ports and receiving second pump radiation at a second input port of the multiple input ports, and
wherein said producing a first radiative output includes producing first and second radiative outputs by at least circulating the first pump radiation in the edge state in a first direction around said closed-loop waveguide resonator while circulating the second pump radiation in the edge state in a second direction around said closed-loop waveguide resonator, the first and second directions being opposite to one another.

13. The method according to claim 1, wherein the first transmission edge band is characterized by a substantially linear dispersion, while the transmission bulk bands are characterized by a substantially random dispersion.

14. The method according to claim 1, wherein said circulating includes circulating energy radiation around the peripheral region of the array such that a dispersion of longitudinal modes of so-circulating radiation is compensated by a dispersion induced by Kerr nonlinearity in the peripheral region.

15. The method according to claim 1, wherein said producing the first radiative output is topologically robust against any defects in the multidimensional array.

16. The method according to claim 1, wherein said producing the first radiative output includes producing single pulses of radiation circulating in at least some of the constituent ring resonators of the peripheral region of the array, wherein different ones of said single pulses of radiation are phase-locked with one another, and wherein at least a single group of said pulses of radiation is circulating in the peripheral region of the array that is configured as a closed-loop waveguide resonator.

17. The method according to claim 1, wherein said producing includes transforming radiation by using a nonlinear process.

18. The method according to claim 1, further comprising:

producing, at the least one output port, an ancillary radiative output caused by propagating the pump radiation in a bulk state through the array, and wherein, for a chosen ancillary frequency of said pump radiation that corresponds to the bulk state and/or for an ancillary power of said pump radiation, a frequency spectrum of the ancillary radiative output includes at least a bulk state oscillating in substantially equally spaced free spectral ranges (FSRs) of the constituent ring resonators.

19. A source of radiation comprising:
at least one radiative pump system;
a multidimensional array of evanescently coupled constituent ring resonators, the array including at least one input port radiatively coupled with the at least one radiative pump system, and at least one output port,
the array being configured
  (19A) to have a transmission spectrum that comprises:
    a repetition of a group of transmission bands that includes a first transmission edge band between first and second respectively corresponding transmission bulk bands, and
    wherein successive groups from said repetition are separated from one another by a first frequency range; and
  (19B) to produce, at the at least one output port, a first radiative output by circulating pump radiation, which has been received through the at least one input port, in an edge state around a peripheral region of the array, wherein the peripheral region is configured as a closed-loop waveguide resonator,
  wherein, for a chosen first power and a first frequency of said first pump radiation, said first radiative output includes a series of groups of pulses of radiation,
  wherein pulses of radiation within each of the groups of pulses of radiation are delayed with respect to one another by a first delay time that is substantially equal to a round-trip time of propagation of the pump radiation through a constituent ring resonator, and
  wherein the groups of pulses of radiation are delayed with respect to one another by a second delay time that is substantially equal to the round-trip time of propagation of the pump radiation in the edge state around a peripheral region of the array.

20. The source of radiation according to claim 19, wherein the array is dimensioned to have an irregular shape.

* * * * *